(12) United States Patent
Ueno

(10) Patent No.: US 6,733,200 B2
(45) Date of Patent: May 11, 2004

(54) CONSTRUCTION OF COVER FOR BALL JOINT

(75) Inventor: Marisa Ueno, São Bernardo do Campo (BR)

(73) Assignee: Dana Industrial S/A, Sao Paulo (BR)

( * ) Notice: Subject to any disclaimer, the term of this patent is extended or adjusted under 35 U.S.C. 154(b) by 0 days.

(21) Appl. No.: 10/183,996

(22) Filed: Jun. 28, 2002

(65) Prior Publication Data

US 2003/0002914 A1 Jan. 2, 2003

(30) Foreign Application Priority Data

Jun. 28, 2001 (BR) ......................................... PI0103298

(51) Int. Cl.$^7$ ............................................... F16C 11/08
(52) U.S. Cl. ................... 403/133; 403/122; 29/898.043
(58) Field of Search ................. 403/122, 123, 403/133, 134, 135; 29/898.043, 898.044, 898.047, 898.048

(56) References Cited

U.S. PATENT DOCUMENTS

| | | | | |
|---|---|---|---|---|
| 3,530,495 A | * | 9/1970 | Kindel | |
| 4,017,197 A | * | 4/1977 | Farrant | |
| 4,720,205 A | * | 1/1988 | Ito | 403/135 X |
| 4,790,682 A | * | 12/1988 | Henkel | 403/135 X |
| 5,531,534 A | * | 7/1996 | Urbach | 403/134 X |
| 5,855,448 A | * | 1/1999 | Showalter et al. | 403/134 |
| 6,287,040 B1 | * | 9/2001 | Fischer | |
| 6,386,787 B1 | * | 5/2002 | Reichelt | 403/133 X |
| 6,592,284 B1 | * | 7/2003 | Rechtien et al. | 403/122 X |
| 2002/0141813 A1 | * | 10/2002 | Davis | 403/122 |

FOREIGN PATENT DOCUMENTS

GB 2142082 A * 1/1985 ................. 403/122

* cited by examiner

*Primary Examiner*—John R. Cottingham
*Assistant Examiner*—Ryan M. Flandro
(74) *Attorney, Agent, or Firm*—Liniak, Berenato & White

(57) ABSTRACT

A construction of a cover for ball joint for application in connections of both angular and rotational movements of automotive vehicles. The cover is constructed with a boss in its outermost circumference so that when assembling the ball joint, the bearing flange that is inserted in the interior of the box, that is closed by the cover, does not burst. Moreover, the bearing is maintained fixed to the assembling place as it is desired, for the perfect operation of the ball joint. The cover constructed in this manner functions as a limiting piece in the assembling process, so that, even if too strongly pressed upon the bearing flange, it may burst only the outermost part of the bearing flange preserving its major part, that will be retained between the recess provided in the interior of the ball joint box and the space immediately posterior to the boss constructed in the outermost circumference of the cover, thus keeping the bearing fixed to its place.

5 Claims, 1 Drawing Sheet

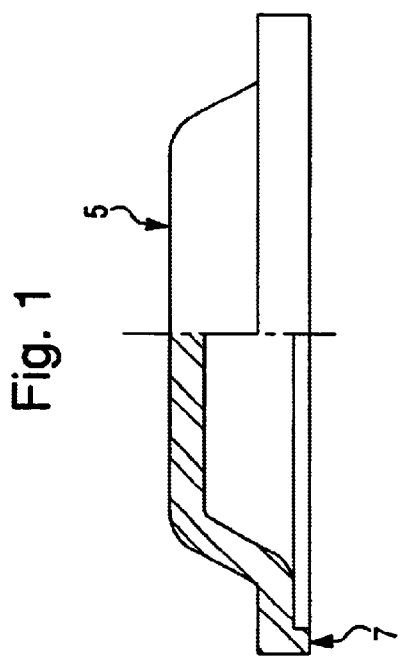
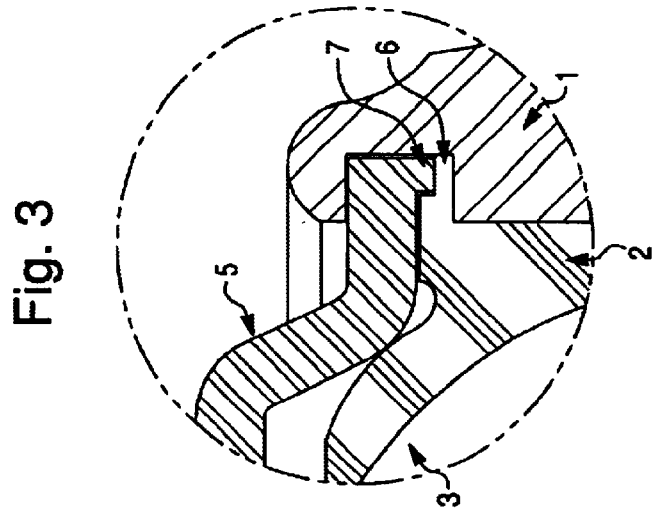
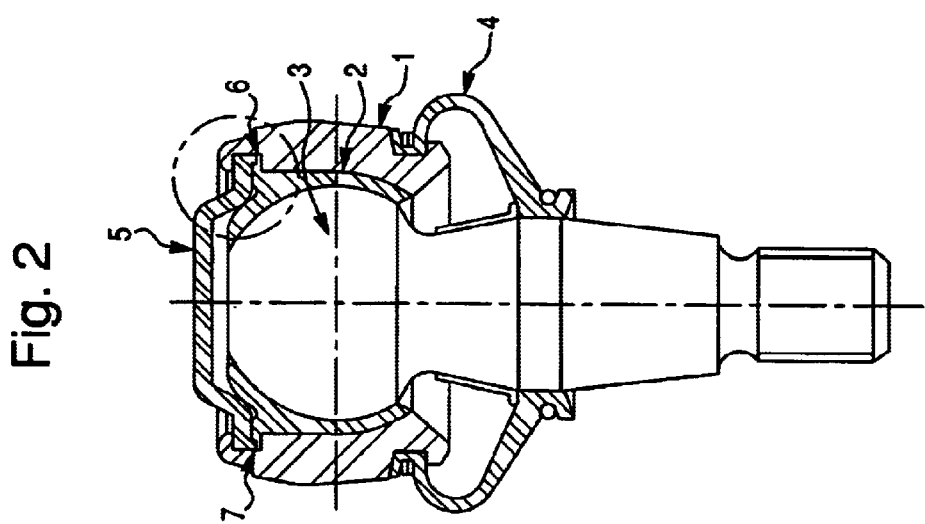

CONSTRUCTION OF COVER FOR BALL JOINT

CROSS-REFERENCE TO RELATED APPLICATIONS

Not Applicable

STATEMENT REGARDING FEDERALLY SPONSORED RESEARCH

Not Applicable

INCORPORATION-BY-REFERENCE OF MATERIAL SUBMITTED ON A COMPACT DISC

Not Applicable

BACKGROUND OF THE INVENTION

1. Field of the Invention

This invention refers to the construction of a cover for ball joint for application in connections of both angular and rotational movement of two parts and, more particularly, for application in automotive vehicles.

2. Description of Related Art

The prior technique for the construction of ball joints is based on a construction composed of a box or receptacle where it is housed a single bearing or a split bearing that in turn houses a ball that is disposed as an integral part of the end of a pin, called ball-end pin. This duly assembled set has a fixing system on the external part of the box or receptacle, the same occurring in the end opposed to the ball, of the so-called ball-end pin, in such a way that, having been fixed the box to mobile part and the ball-end pin to another, it provides to both parts angular and rotational movements.

The conventional ball joints generally are assembled by utilizing a cover having a rim with a smooth circumference. In the assembling process, this rim of the external circumference of the cover overlaps a flange provided in the bearing that involves the spherical head of the ball-end pin. The flange provided in the bearing aims to fix it in the interior of the ball joint box in order that the same does not move in the interior of this box when the ball joint is in operation. What occurs, however, is that as this bearing flange is pressed between a recess provided in the internal face of the joint box and the cover of the same that overlaps it. When the ball joint box closes with the cover, the closing process tends to press too tightly the cover over the flange, causing its rupture. In other words, the ball joint box is of metallic material and receives in its recess the flange of the bearing that is made of elastomer and the box cover, that is also metallic, overlaps the bearing flange. Thus, when one closes of the ball joint box, which happens by a rolling process, one presses excessively the two metallic components over the elastomer and this sometimes causes a breakage, rupture or bursting of the components. This flaw makes the bearing to get loose inside the ball joint box impairing its operation.

SUMMARY OF THE INVENTION

It is an object of this invention to eliminate this undesirable flaw, by building a cover which, irrespectively of the pressure that is exerted upon it when of the closing of the ball joint, does not burst the bearing flange, so that, after the complete assembling of the ball joint the same remains fixed to the place that is intended to it, as desired.

To obtain this desired result, a cover was constructed which, also made of metallic material, is provided with a recess in its outermost circumference in such a fashion that, even if too strongly pressed during assembly, the boss exerting the function of a limiting piece, presses the bearing flange, but, only in its outermost circumference. Even under extreme pressure conditions causing the bearing flange to burst, however, rupture only occurs in its outermost circumference, maintaining intact the major part of this flange that is trapped between the box recess and the profile that becomes a recess of the cover, as result of the construction of the boss in its outermost circumference.

BRIEF DESCRIPTION OF THE DRAWINGS

Next, this invention is detailed, being presented the description of an example of embodiment that is shown in the attached drawings, in which:

FIG. 1 is a partial cross section of the cover;

FIG. 2 is a partial cross section of the cover already assembled on a ball joint; and FIG. 3 is an enlargement of the constructional detail assembled on the ball joint.

DETAILED DESCRIPTION OF THE PREFERRED EMBODIMENT

As it is seen in the attached figures, the ball joint comprises a box or housing 1 in the interior of which is assembled a bearing 2 that receives in its interior a ball-end pin 3. Sealing the opening of the box or housing 1, through which the ball-end pin 3 projects, is a sealing cap (4) that prevents the entry of impurities in the interior of the ball joint. In the opposite side of the box opening 1, through which the ball-end pin 3 projects, is the cover 5 forming the object of this invention. The cover 5 also has the function of closing the ball joint, sealing it further to prevent the entry of impurities. Besides the closing and sealing function, this cover 5 has also the function of pressing the bearing 2 against the ball of the ball-end pin 3 keeping it firmly fixed to the assembling place. And, this latter function is exerted through the pressure that the cover exerts upon the flange 6 of the bearing 2 that is pressed between the box recess 1 and the cover 5 during the assembling operation.

In order to avoid failure or bursting of the flange 6 of the bearing 2 when suffering an excessive pressure during the assembling operation, the boss 7 is provided in the outermost circumference of the cover 5. The boss 7 functions as a limiting piece that assures the maintenance of sufficient part of the bearing 2 flange 6, even if in the assembling process the cover 5 is excessively tightened against the box recess 1, as, it still preserves a portion of the bearing 2 flange 6 in quantity sufficient to maintain the bearing 2 fixed in the interior of the box 1 as is desired for the perfect operation of the ball joint.

While the foregoing invention has been shown and described with reference to a preferred embodiment, it will be understood by those of skill in the art that various changes in form and detail may be made therein without departing from the spirit and scope of the instant invention.

What is claimed is:

1. A cover for a ball joint having a housing for retaining a bearing and a ball end, wherein a pin extends from the ball end and projects out of the housing, and said bearing at least partially circumscribes said ball end, said cover comprising a boss formed at an outermost circumference of said cover, said boss engaging a fixing flange of said bearing at opposite positions on the outside of said bearing to prevent a bursting of the fixing flange of the bearing during an assembling process, wherein said boss defines a projection that mates with a corresponding peripheral recess formed on the fixing flange of said bearing.

2. The cover for a ball joint according to claim 1, wherein said boss at least partially circumscribes said bearing.

3. The cover for ball joint according to claim 1, wherein the boss provided in the outermost circumference of the cover operates as a limiter of position of the cover during the assembling process of the ball joint.

4. The cover for ball joint according to claim 2, wherein the boss provided in the outermost circumference of the cover operates as a limiter of position of the cover during the assembling process of the ball joint.

5. A ball joint assembly comprising:

a housing into which is assembled a bearing that at least partially circumscribes a ball-end, a sealing cap sealing one opening of the housing through which a ball-end pin projects to thereby prevent the entry of impurities in an interior of the ball joint, and a cover disposed on an opposite opening of the housing, wherein said cover comprises a boss at its outermost circumference, said boss engaging a fixing flange of said bearing at opposite sides of said bearing to prevent a bursting of said fixing flange of the bearing during an assembling process, wherein said boss defines a projection that mates with and circumscribes a corresponding peripheral recess formed on said fixing flange of said bearing.

* * * * *